United States Patent
Lin et al.

(10) Patent No.: US 7,630,735 B2
(45) Date of Patent: Dec. 8, 2009

(54) INTELLIGENT METHOD FOR DYNAMICALLY SWITCHING COMMUNICATION MODES OF A DUAL-MODE COMMUNICATION MODULE

(75) Inventors: Feng Lin, Taipei (TW); Shin-Ming Cheng, Taipei (TW); Shun-Ren Yang, Taipei (TW); Pei-Tang Huang, Taipei (TW)

(73) Assignee: Inventec Appliances Corp., Wugu Shiang, Taipei (TW)

( * ) Notice: Subject to any disclaimer, the term of this patent is extended or adjusted under 35 U.S.C. 154(b) by 499 days.

(21) Appl. No.: 11/684,635

(22) Filed: Mar. 12, 2007

(65) Prior Publication Data

US 2008/0227482 A1 Sep. 18, 2008

(51) Int. Cl.
*H04M 1/00* (2006.01)
(52) U.S. Cl. .............. 455/552.1; 455/127.4; 455/127.5; 455/428; 348/14.01
(58) Field of Classification Search ............. 455/552.1, 455/432.1, 435.1, 418, 266, 277.2, 200.1, 455/181.1, 184.1, 177.1, 127.4, 127.5, 553; 348/14.01; 709/220, 250, 202, 203
See application file for complete search history.

(56) References Cited

U.S. PATENT DOCUMENTS

2006/0253529 A1* 11/2006 Kirkup et al. ............... 709/203
2007/0222852 A1* 9/2007 Jang ......................... 348/14.01
2009/0077207 A1* 3/2009 Karaoguz et al. ........... 709/220
2009/0177730 A1* 7/2009 Annamalai et al. .......... 709/202

OTHER PUBLICATIONS

Digital cellular telecommunications system(Phase 2+); Generic access to the A/Gb interface; Stage 2 (3GPP TS 43.318 version 6.7.0 Release 6), Technical Specification, Jun. 2006, p. 1-72.

* cited by examiner

*Primary Examiner*—Tan Trinh
(74) *Attorney, Agent, or Firm*—Winston Hsu

(57) ABSTRACT

With the aid of critical conditions including remaining power of a communication module and both an available bandwidth and a credit of utilizing communication functions of said communication module, and by cooperating with available network services of said communication module, a communication network currently appropriates for said communication module to be switched to is determined, for achieving an aim of retrieving network services and taking requirements of users into consideration simultaneously. Moreover, when there are no available network services for the communication module, said communication module enters a sleep state for about less than ten seconds, for preventing said communication module from consuming additional power or from bringing in unnecessary consumption in other aspects, where both the additional power and the unnecessary consumption in other aspects are caused from the fact that the communication module searches for available network services continuously.

15 Claims, 1 Drawing Sheet

INTELLIGENT METHOD FOR DYNAMICALLY SWITCHING COMMUNICATION MODES OF A DUAL-MODE COMMUNICATION MODULE

BACKGROUND OF THE INVENTION

1. Field of the Invention

The present invention relates to a method for switching communication modes of a dual-mode communication module, and more particularly, to an intelligent method for dynamically switching communication modes of a dual-mode communication apparatus.

2. Description of the Prior Art

A modern popular cell phone conventionally supports a plurality of communication modes for utilizing the plurality of supported communication modes. With variant locations and various utilized communication networks while utilizing a conventional cell phone, switching between various communication networks and between cells of a communication network is strictly regulated for handling switches of communication networks or cells under various conditions, which are highly related to requirements of users and according to whether a communication network is currently available.

In the specification 3GPP TS 43.318 V6.7.0, which was published on June, 2006, switching between communication networks to a certain degree and related to both the GERAN/UTRAN mode (for Global System for Mobile communications (GSM) Enhanced Data rates for GSM Evolution (EDGE) Radio Access Network (GERAN)/Universal Mobile Telecommunications System (UMTS) Terrestrial Radio Access Network (UTRAN) mode and briefed as G/U mode) and the Generic Access Network mode (briefed as GAN mode) are described. In the specification, a cell phone is assumed to merely perform switching between the G/U mode and the GAN mode. After a cell phone boots up, four default user-preferred settings, which include GERAN/UTRAN-only (briefed as G/U-only), GERAN/UTRAN-preferred (briefed as G/U-preferred), GAN-only, and GAN-preferred, are provided.

The setting G/U-only indicates that after the cell phone boots up, the cell phone merely enters the G/U mode other than the GAN mode, and a No Service state of the GAN mode. The setting G/U-preferred indicates that after the cell phone boots up, the cell phone enters the G/U mode in principle, however, under certain conditions, said cell phone switches to utilize the GAN mode, where the certain conditions include failing to access the G/U communication network with a cell, which utilizes the G/U mode inside said cell phone, i.e., the G/U communication network cannot be discovered by said cell phone, and failing to register said G/U communication network. Similarly, the setting GAN-only indicates that after the cell phone boots up, said cell phone merely enters the GAN mode other than the G/U mode, and a No Service state of the G/U mode. The setting GAN-preferred indicates that after the cell phone boots up, said phone enters the GAN mode in principle, however, under certain conditions, said cell phone switches to enter the G/U communication network, where the certain conditions include failing to access the GAN communication network with a cell, which utilizes the GAN mode inside said cell phone, i.e., the GAN communication network cannot be discovered, and failing to register the GAN communication network.

Switches between the G/U mode and the GAN mode include rove-in, rove-out, and handover between the G/U mode and GAN mode. The rove-in indicates switching from the G/U mode to the GAN mode when the cell phone does not transmit data currently. The rove-out indicates switching from the GAN mode to the G/U mode when the cell phone does not transmit data currently. The handover indicates switching from the G/U mode to the GAN mode or from the GAN mode to the G/U mode when the cell phone transmits data currently.

However, there are benefits and problems in both the GAN mode and the G/U mode. Therefore, for a user, a unique preferred communication mode exists among both the GAN mode and the G/U mode under different default user-preferred settings. Speaking of the setting GAN-preferred, though the abovementioned specification discloses a communication mode switching method according to whether a communication network is available under the setting GAN-preferred, said abovementioned specification does not concretely disclose a proper communication mode switching strategy for various requirements of the user.

SUMMARY OF THE INVENTION

The claimed invention discloses an intelligent method for dynamically switching communication modes of a dual-mode communication module, which utilizes a first communication mode and a second communication mode. The method comprises checking whether the dual-mode communication module registers on a network controller of the second communication mode when the dual-mode communication module accesses the first communication mode and does not satisfy a critical condition, and determining whether the dual-mode communication module continues to access the first communication mode or switches to access the second communication mode according to a result of checking whether said dual-mode communication module registers on the network controller of said second communication mode; checking whether a network cell of the first communication mode exists when the dual-mode communication module accesses the second communication mode and satisfies the critical condition, and determining whether the dual-mode communication module continues to access the second communication mode or switches to access the first communication mode according to a result of checking whether the network cell of the first communication mode exists; and checking whether the dual-mode communication module registers on the network controller of the second communication mode when the communication module accesses the first communication mode and does not reach an available network domain of the first communication mode, and determining whether the dual-mode communication module switches to access the second communication mode or accesses neither the first nor second communication modes according to a result of checking whether the dual-mode communication module registers on the network controller of the second communication mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
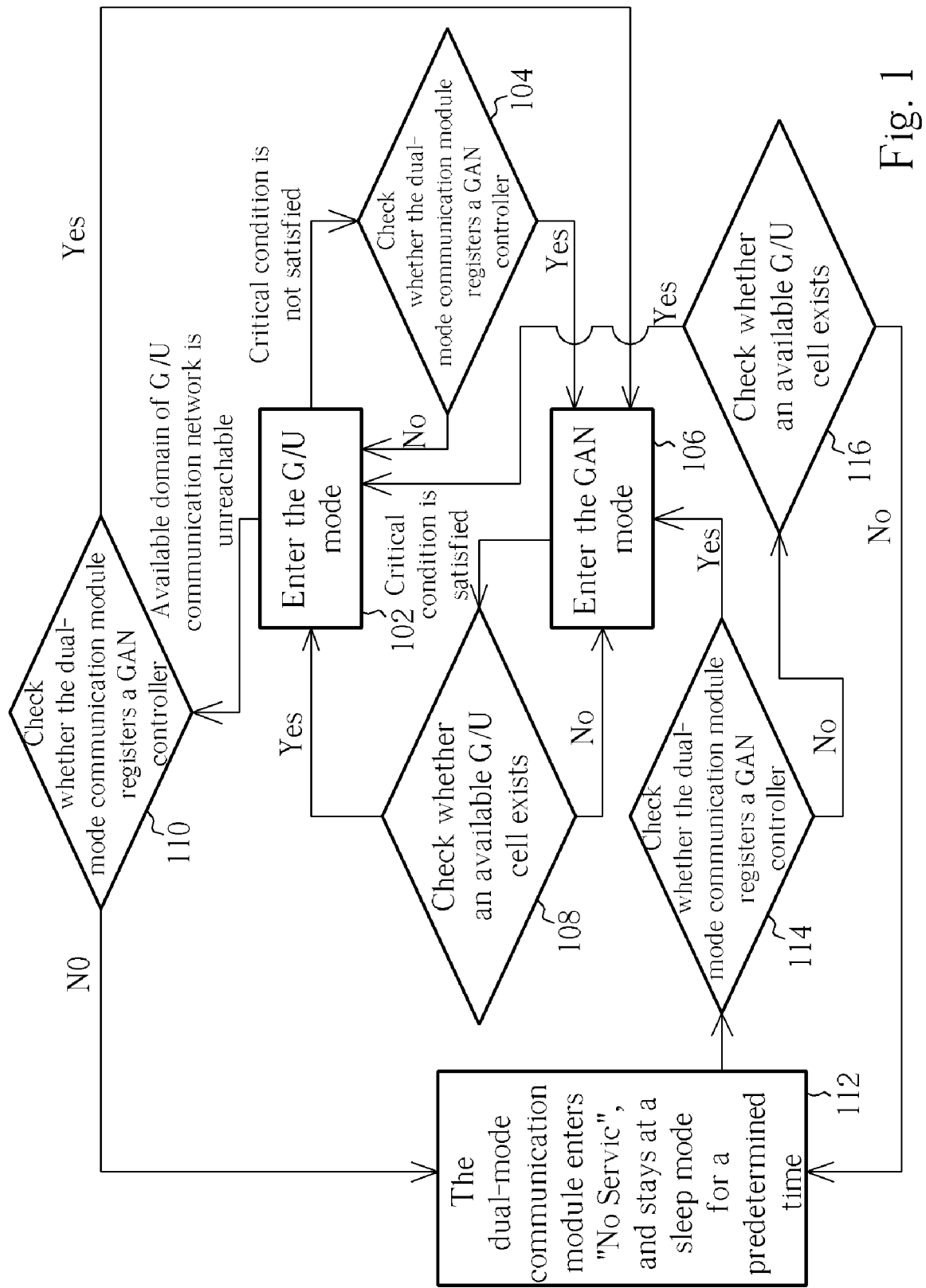
FIG. 1 is a flowchart of the intelligent method for dynamically switching communication modes of a dual-mode communication module in the present invention.

Therefore, an intelligent method for dynamically switching between the GAN mode and the G/U mode under the setting GAN-preferred is provided for dynamically determining to switch a communication mode of a cell phone to one of both the GAN mode and the G/U mode according to critical conditions related to requirements of a user. Note that the method of the present invention may be simultaneously performed with the communication mode switching method disclosed in the abovementioned specification under the setting GAN-preferred, i.e., the method of the present invention is an enhancement of said communication mode switching method of the abovementioned specification for solving the problem of not taking requirements of the user into consideration in the prior art while switching communication modes of the cell phone under the setting GAN-preferred.

Please refer to FIG. 1, which is a flowchart of the intelligent method for dynamically switching communication modes of a dual-mode communication module in the present invention. The method shown in FIG. 1 includes the following steps:

Step 102: The dual-mode communication module enters the G/U mode. When the dual-mode communication module does not satisfy a critical condition, go to Step 104. When the dual-mode communication module does not reach an available domain of the G/U communication network, go to Step 110.

Step 104: Check whether the dual-mode communication module registers a network controller of the GAN mode, which is denoted as a generic Access Network (GAN) controller or a GANC. When the dual-mode communication module registers a GAN controller, go to Step 106. Otherwise, go to Step 102.

Step 106: The dual-mode communication module enters the GAN mode. When the dual-mode communication mode satisfies the critical condition, go to Step 108.

Step 108: Check whether an available cell utilizing the G/U mode exists, where the cell may also be denoted as a G/U cell. When the available G/U cell exists, go to Step 102. Otherwise, go to Step 106.

Step 110: Check whether the dual-mode communication module registers a GAN controller. When the dual-mode communication module registers the GAN controller, go to Step 106. Otherwise, go to Step 112.

Step 112: The dual-mode communication module enters a state of No Service, i.e., the dual-mode communication module utilizes neither the G/U communication network nor the GAN communication network, and said dual-mode communication module enters a sleep mode and stays at the sleep mode for a predetermined time.

Step 114: Check whether the dual-mode communication module registers a GAN controller. When the dual-mode communication module registers the GAN controller, go to Step 106. Otherwise, go to Step 116.

Step 116: Check whether an available G/U cell for the dual-mode communication module exists. When the available G/U cell for the dual-mode communication module exists, go to Step 102. Otherwise, go to Step 112.

The method of the present invention is performed in a dynamic manner. Therefore, according to the method of the present invention, the dual-mode communication module built in the cell phone may be dynamically switched between the G/U mode and the GAN mode under the setting GAN-preferred for further matching requirements of the user according to various critical conditions and to network-related conditions described in the abovementioned specification.

The method of the present invention begins at Step 106 since said method is performed under the setting GAN-preferred. It indicates a fact that the dual-mode communication module is initialized to enter the GAN mode after booting up when no critical conditions are satisfied in the beginning. The indicated fact is also described in the abovementioned specification and is not described later. The method of the present invention is performed around Step 102 and Step 106, i.e. switching between the G/U mode and the GAN mode, for describing various conditions of switching between the G/U mode and the GAN mode.

As described in Step 102, there are two conditions of the dual-mode communication module of quitting the G/U mode. A first condition indicates that when the dual-mode communication module does not satisfy a certain critical condition, go to Step 104. A second condition indicates that when the dual-mode communication module does not reach an available domain of the G/U communication network, go to Step 110.

Under the first condition of quitting the G/U mode, whether the dual-mode communication module registers a GAN controller of the GAN communication network is first checked. When the dual-mode communication module registers a certain GAN controller, said dual-mode communication module switches to the GAN mode, i.e., go to Step 106. When the dual-mode communication module does not register any GAN controller, said dual-mode communication module stays at the G/U mode, i.e., go to Step 102.

Critical conditions of the first condition of quitting the G/U mode includes whether a remaining power of the dual-mode communication module is lower than a predetermined power, whether an available bandwidth of said dual-mode communication module for utilizing the GAN communication network is narrower than an available bandwidth of said dual-mode communication module for utilizing the G/U communication network, and whether a credit of said dual-mode communication module for utilizing the GAN communication network is larger than a credit of said dual-mode communication network for utilizing the G/U communication network. Among the abovementioned critical conditions, the remaining power of the dual-mode communication module is the most dominant. It is because a power consumption rate of the dual-mode communication module for utilizing the GAN communication network is higher than a power consumption rate of said dual-mode communication module for utilizing the G/U communication network. That is, power consumption under the GAN mode is severer than power consumption under the G/U mode. Therefore, when the remaining power of the dual-mode communication module is above the critical power, utilizing the GAN communication network does not put an unaffordable load on said dual-mode communication module so that it is more appropriate for having the dual-mode communication module to stay at the GAN mode. However, when the remaining power of the dual-mode communication module is below the critical power, utilizing the GAN communication network puts an unaffordable load on said dual-mode communication module so that it is more appropriate for switching said dual-mode communication module to the G/U mode, which leads to less power consumption for said dual-mode communication module. When the critical condition relates to the bandwidth, a communication network capable of providing a larger available bandwidth is more appropriate for the dual-mode communication module to be utilized. Similarly, when the critical condition relates to the credit of utilizing a communication network, a communication network corresponding to a larger credit is more appropriate for the dual-mode communication module to be utilized.

Under the second condition of quitting the G/U mode, i.e., when the dual-mode communication module does not reach an available domain of the G/U communication network, whether said dual-mode communication module registers a GAN controller of the GAN communication network is first checked also. When the dual-mode communication module registers a certain GAN controller, said dual-mode communication module switches to utilize the GAN communication network, i.e., go to Step 106. When the dual-mode communication module does not register any GAN controller, since said dual-mode communication module cannot utilize the G/U communication network currently, said dual-mode communication module may merely enter a state of No Service, i.e., go to Step 112, and it indicates a largest difference between Step 110 and Step 104. Note that when the dual-mode communication module enters the state of No Service, according to the method of the present invention, said dual-mode communication module temporarily enters a sleep mode and stays at the sleep mode for a predetermined time. When the dual-mode communication module enters the sleep mode, said dual-mode communication module does not detect whether a GAN communication network or a G/U communication network can be utilized until the predetermined time is reached. According to a preferred embodiment of the present invention, the predetermined time is less than 10 seconds. The reason why the dual-mode communication module enters the sleep mode for the predetermined time lies on the following fact to be described. Under the GAN mode, the dual-mode communication module enters the sleep mode in a constant frequency and for a constant time. However, when the dual-mode communication module cannot utilize any one of the GAN communication network and the G/U communication network and does not reach the time for entering the sleep mode, the dual-mode communication module keeps on searching available communication networks instead of entering the sleep mode so that unnecessary power consumption or consumption in other aspects is caused, and it explains the reason why the dual-mode communication module has to enter the sleep mode for the predetermined time, i.e., preventing unnecessary consumption. Therefore, a property of the G/U communication network is skillfully utilized in the method of the present invention, where the property says that when the dual-mode communication module cannot utilize any available communication networks, said dual-mode communication module is forced to enter the sleep mode for a time for avoiding the unnecessary power consumption or the consumption in other aspects, each of which is caused by meaninglessly searching for available communication networks. After the predetermined time is reached and when the dual-mode communication module quits the sleep mode, an available GAN controller of the GAN communication network is searched again to be registered in Step 114. When the available GAN controller for being registered is found in Step 114, Step 106 is immediately performed for switching the dual-mode communication module to the GAN mode. When an available GAN controller for being registered is still not found, go to Step 116. When an available G/U cell for the dual-mode communication module is found in Step 116, Step 102 is immediately performed for switching said dual-mode communication module to the G/U mode. When an available G/U cell is still not found in Step 116, Step 112 is performed for having the dual-mode communication module to enter the sleep mode again. After the dual-mode communication module quits the sleep mode again, both Step 114 and Step 116 are ready to be performed again for searching for an available GAN controller or an available G/U cell for said dual-mode communication module to register or to utilize.

As described in Step 106 and in the method of the present invention, merely the critical conditions are treated as factors for having the dual-mode communication module to quit the GAN mode, where said critical conditions are the same with those described in Step 102 so that said critical conditions are not described further. When the dual-mode communication module satisfies the critical condition and quits the GAN mode, available G/U cells for said dual-mode communication module are first searched in Step 108. When an available G/U cell for the dual-mode communication module is found in Step 108, Step 102 is immediately performed for switching said dual-mode communication module to the G/U mode. When no available G/U cells for the dual-mode communication module are found in Step 108, Step 106 is performed for having said dual-mode communication module stay at the GAN mode.

Note that there are further switching methods for both the G/U mode and the GAN mode in the dual-mode communication module, i.e., the abovementioned operation including rove-in, rove-out, and the communication mode switching method under the setting GAN-preferred, all of which are described in the abovementioned specification in the prior art. However, the included operation is not related to the critical conditions corresponding to requirements of the user so that said included operation is not discussed further. Moreover, the aim of the method of the present invention is for neutralizing problems of not taking requirements of the user into consideration under the setting GAN-preferred about the communication mode switching method recorded in the specification of the prior art. Therefore, utilizing the critical conditions in the method of the present invention makes a largest difference with the communication mode switching method under the setting GAN-preferred and recorded in the specification of the prior art.

Note that the method of the present invention may be utilized in communication modules equipped with communication-related functions and switched between the GAN communication network and the G/U communication network, where the communication modules are not restricted to be portable electronic communication devices such as cell phones.

An intelligent method for dynamically switching communication modes of a dual-mode communication module is provided in the present invention. The aim of the present invention for taking requirements of the user into consideration in an optimal manner, for retrieving network services, and for neutralizing the problem of not including critical conditions related to the requirements of the user in the specification of the prior art simultaneously is thus achieved by utilizing the method provided in the present invention. The intelligent method of the present invention is for dynamically determining a current appropriate communication mode of a dual-mode communication module according to critical conditions including a remaining power of the dual-mode communication module, a credit of said dual-mode communication module for utilizing a communication mode, and an available bandwidth for utilizing a communication mode. Furthermore, in the method of the present invention, the aim of avoiding unnecessary consumption in power and in other aspects is also achieved by appropriately having the dual-mode communication module enter a sleep mode for a predetermined time when said dual-mode communication module cannot utilize any communication networks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An intelligent method for dynamically switching communication modes of a dual-mode communication module, which utilizes a first communication mode and a second communication mode, the method comprising:

checking whether the dual-mode communication module registers on a network controller of the second communication mode when the dual-mode communication module accesses the first communication mode and does not satisfy a critical condition, and determining whether the dual-mode communication module continues to access the first communication mode or switches to access the second communication mode according to a result of checking whether said dual-mode communication module registers on the network controller of said second communication mode;

checking whether a network cell of the first communication mode exists when the dual-mode communication module accesses the second communication mode and satisfies the critical condition, and determining whether the dual-mode communication module continues to access the second communication mode or switches to access the first communication mode according to a result of checking whether the network cell of the first communication mode exists; and checking whether the dual-mode communication module registers on the network controller of the second communication mode when the communication module accesses the first communication mode and does not reach an available network domain of the first communication mode, and determining whether the dual-mode communication module switches to access the second communication mode or accesses neither the first nor second communication modes according to a result of checking whether the dual-mode communication module registers on the network controller of the second communication mode.

2. The method of claim 1 wherein the critical condition comprises:
a remaining power of the dual-mode communication module being less than a critical power.

3. The method of claim 1 wherein the critical condition comprises:
an available bandwidth of the second communication mode for the dual-mode communication module being less than an available bandwidth of the first communication mode for said dual-mode communication module.

4. The method of claim 1 wherein the critical condition comprises:
a credit of the second communication mode for the dual-mode communication module being larger than a credit of the first communication mode for said dual-mode communication module.

5. The method of claim 1 wherein determining whether the dual-mode communication module continues to access the first communication mode or switches to access the second communication mode according to the result of checking whether the dual-mode communication module registers on the network controller of the second communication mode comprises:
determining that the dual-mode communication module switches to access the second communication mode from the first communication mode when said dual-mode communication module registers on the network controller of said second communication mode.

6. The method of claim 1 wherein determining whether the dual-mode communication module continues to access the first communication mode or switches to access the second communication mode according to the result of checking whether the dual-mode communication module registers on the network controller of the second communication mode comprises:
determining that the dual-mode communication module continues to access the first communication mode when said dual-mode communication module does not register on any network controllers of said second communication mode.

7. The method of claim 1 wherein determining whether the dual-mode communication module continues to access the second communication mode or switches to access the first communication mode according to the result of checking whether the network cell of the first communication mode exists comprises:
determining that the dual-mode communication module switches to access the first communication mode from the second communication mode when the network cell of the first communication mode for the dual-mode communication module exists.

8. The method of claim 1 wherein determining whether the dual-mode communication module continues to access the second communication mode or switches to access the first communication mode according to the result of checking whether the network cell of the first communication mode exists comprises:
determining that the dual-mode communication module continues to access the second communication mode when the network cell of the first communication mode for the dual-mode communication module does not exist.

9. The method of claim 1 wherein determining whether the dual-mode communication module switches to access the second communication mode or accesses neither the first nor second communication modes according to the result of checking whether the dual-mode communication module registers on the network controller of the second communication mode comprises:
determining that the dual-mode communication module switches to access the second communication mode when said dual-mode communication mode registers on the network controller of said second communication mode.

10. The method of claim 1 wherein determining whether the dual-mode communication module switches to access the second communication mode or accesses neither the first nor second communication modes according to the result of checking whether the dual-mode communication module registers on the network controller of the second communication mode comprises:
determining that the dual-mode communication module accesses neither of the first and second communication modes when said dual-mode communication module does not register on any network controllers of said second communication mode.

11. The method of claim 10 further comprising:
having the dual-mode communication module enter a sleep mode and stay at the sleep mode for a predetermined time.

12. The method of claim 11 wherein the predetermined time is less than ten seconds.

13. The method of claim 1 wherein the first communication mode is Global System for Mobile communications (GSM) Enhanced Data rates for GSM Evolution (EDGE) Radio Access Network (GERAN)/Universal Mobile Telecommunications System (UMTS) Terrestrial Radio Access Network (UTRAN) mode, which is also denoted as GERAN/UTRAN mode or G/U mode.

14. The method of claim 1 wherein the second communication mode is Generic Access Network mode (GAN mode).

15. The method of claim 14 wherein the network controller of the second communication mode is a Generic Access Network Controller (GAN controller or GANC).

* * * * *